US009182929B2

(12) United States Patent
Murata

(10) Patent No.: US 9,182,929 B2
(45) Date of Patent: Nov. 10, 2015

(54) COMPUTER READABLE MEDIUM, INFORMATION PROCESSING DEVICE, AND PRINTING DEVICE

(75) Inventor: Mareyuki Murata, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1604 days.

(21) Appl. No.: 12/147,942

(22) Filed: Jun. 27, 2008

(65) Prior Publication Data
US 2009/0070703 A1 Mar. 12, 2009

(30) Foreign Application Priority Data

Jun. 28, 2007 (JP) ................................. 2007-170115

(51) Int. Cl.
*H04N 1/00* (2006.01)
*G06F 3/12* (2006.01)

(52) U.S. Cl.
CPC ............ *G06F 3/1204* (2013.01); *G06F 3/1205* (2013.01); *G06F 3/1206* (2013.01); *G06F 3/1246* (2013.01); *G06F 3/1272* (2013.01); *G06F 3/1285* (2013.01); *G06F 3/1287* (2013.01)

(58) Field of Classification Search
CPC ............ G06F 17/30899; G06F 3/0481; G06F 17/211; G06F 17/218; G06F 17/212; G06F 17/2235; G06F 17/30905; G06F 3/1246; H04N 1/00464
USPC .................................. 715/234, 238, 760, 781
See application file for complete search history.

(56) References Cited

U.S. PATENT DOCUMENTS

| 6,968,338 | B1 * | 11/2005 | Gawdiak et al. | 707/741 |
| 6,973,627 | B1 * | 12/2005 | Appling | 715/781 |
| 6,976,226 | B1 * | 12/2005 | Strong et al. | 715/788 |
| 7,240,281 | B2 * | 7/2007 | Gomi et al. | 715/209 |
| 7,502,995 | B2 * | 3/2009 | Takagi et al. | 715/234 |
| 7,581,173 | B1 * | 8/2009 | Ferguson et al. | 715/235 |
| 7,620,903 | B1 * | 11/2009 | Rasmussen et al. | 715/762 |
| 8,151,183 | B2 * | 4/2012 | Chen et al. | 715/234 |
| 2002/0174145 | A1 * | 11/2002 | Duga et al. | 707/513 |

(Continued)

FOREIGN PATENT DOCUMENTS

| JP | 4080812 A | 3/1992 |
| JP | 10040062 A | 2/1998 |

(Continued)

OTHER PUBLICATIONS

W3C, "Links in HTML documents", Aug. 16, 2000, WayBack Machine, pp. 1-10.*
William Robert Stanek, "Chapter 6-Effective Use of Tables", WayBack Machine, pp. 1-34.*
Bobby Van Der Sluis, "Exploring Footers", Feb. 6, 2004, A List Apart Magazine, pp. 1-6.*

(Continued)

*Primary Examiner* — Shen Shiau
(74) *Attorney, Agent, or Firm* — Banner & Witcoff, Ltd.

(57) ABSTRACT

A computer readable medium has a browser-openable language file stored thereon. The language file includes a first description concerning a first object, a second description concerning a second object, the first and second descriptions being configured to set the first object with the second object specified as a link destination thereof and to display the second object in a display area of a browser in response to the first object being selected on the browser when the language file is opened with the browser, and a third description provided under the second description so as to display a third object with a vertical size substantially equal to or larger than a vertical size of the display area of the browser.

18 Claims, 10 Drawing Sheets

(56) References Cited

U.S. PATENT DOCUMENTS

| | | | |
|---|---|---|---|
| 2004/0128280 A1* | 7/2004 | Gomi et al. ............... 707/1 |
| 2004/0169672 A1 | 9/2004 | Misumi | |
| 2004/0255244 A1* | 12/2004 | Filner et al. ............ 715/517 |
| 2007/0038927 A1* | 2/2007 | Dallett et al. ............ 715/513 |
| 2008/0120538 A1* | 5/2008 | Kurz et al. ............... 715/255 |
| 2008/0184138 A1* | 7/2008 | Krzanowski et al. ...... 715/760 |
| 2010/0153682 A1* | 6/2010 | Jahankhani ............... 711/206 |

FOREIGN PATENT DOCUMENTS

| | | |
|---|---|---|
| JP | 10187112 A | 7/1998 |
| JP | 2000222330 A | 8/2000 |
| JP | 2002182715 A | 6/2002 |
| JP | 2004062423 A | 2/2004 |
| JP | 2005346309 A | 12/2005 |

OTHER PUBLICATIONS

Tagindex, URL: www.tagindex.com/html_tag/link/sample06.html; Published Mar. 2, 2004 per Wayayback Machine; pp. 1-10.*

Compgroups, "In page anchor problem"; Published Jul. 19, 2004; pp. 1-3.*

Kinsner et al. ("Hypertext Markup Language", Wiley Encyclopedia of Electrical and Electronics Engineering, 1999, pp. 1-38).*

Japanese notice of allowance for application No. 2007-170115 mailed Mar. 27, 2012.

Notification of Reasons for Rejections for Japanese patent application No. 2007-170115 mailed Jan. 10, 2012.

"HTML tag/link tag/set a link to an object on the same page—TAG index", retrieved from URL: <http://www.tagindex.com/html_tag/link/a_name.html> on May 11, 2007. See statement of relevance in Specification at para. [0007].

* cited by examiner

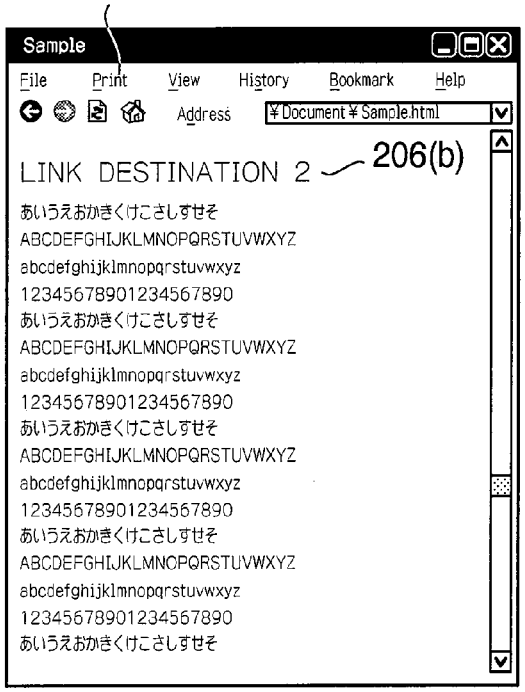
FIG.6A PRIOR ART
FIG.6B
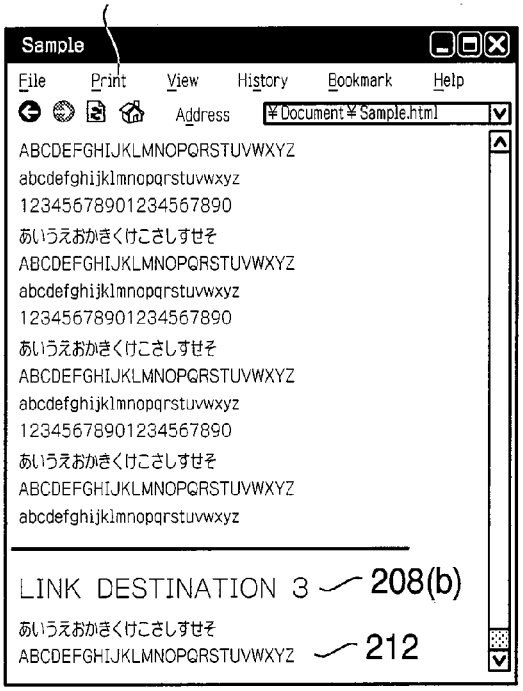
FIG.7A PRIOR ART
FIG.7B

FIG.12A

```
<HTML>
<HEAD>
<TITLE>SAMPLE1</TITLE>
</HEAD>
<BODY>
<P><A href=sample2.html#target>LINK</A></P>
</HTML>
```

```
<HTML>
<HEAD>
<TITLE>SAMPLE2</TITLE>
</HEAD>
<BODY>
<P>あいうえおかき(に)ございます</P>
<P>ABCDEFGHIJKLMNOPQRSTUVWXYZ</P>
<P>abcdefghijklmnopqrstuvwxyz</P>
<P>1234567890123456789C</P>
<P>あいうえおかき(に)ございます</P>
<P>ABCDEFGHIJKLMNOPQRSTUVWXYZ</P>
<P>abcdefghijklmnopqrstuvwxyz</P>
<P>1234567890123456789C</P>
<P>あいうえおかき(に)ございます</P>
<P>ABCDEFGHIJKLMNOPQRSTUVWXYZ</P>
<P>abcdefghijklmnopqrstuvwxyz</P>
<P>1234567890123456789C</P>
<P>あいうえおかき(に)ございます</P>
<P>ABCDEFGHIJKLMNOPQRSTUVWXYZ</P>
<P>abcdefghijklmnopqrstuvwxyz</P>
<P>1234567890123456789C</P>
<P>あいうえおかき(に)ございます</P>
<P>ABCDEFGHIJKLMNOPQRSTUVWXYZ</P>
<HTD><P><font size=6><A name=target><b>LINK DESTINATION</b></A></font></P>
<P>あいうえおかき(に)ございます</P>
<P>ABCDEFGHIJKLMNOPQRSTUVWXYZ</P>
<table border=0 width=100% height=120%>
<tr><td><P></P></td></tr>
</table>
</BODY>
</HTML>
```

1106
1104
1108
1110

COMPUTER READABLE MEDIUM, INFORMATION PROCESSING DEVICE, AND PRINTING DEVICE

CROSS-REFERENCE TO RELATED APPLICATION

This application claims priority under 35 U.S.C. §119 from Japanese Patent Application No. 2007-170115 filed on Jun. 28, 2007. The entire subject matter of the application is incorporated herein by reference.

BACKGROUND

1. Technical Field

The following description relates to one or more technologies regarding a language file described with an object set with another object specified as a link destination thereof.

2. Related Art

An information processing device (hereinafter referred to as a PC) can display a language file described in a language such as HTML (HiperText Markup Language) and XML (Extensible Markup Language) as a page with application software (i.e., browser).

For example, it is possible to set a tag specifying a link destination <A href="#target"> for an object (text, image, etc.) in a language file described in HTML (hereinafter referred to as an HTML file), and concurrently to set a tag <a name="target"> as the link destination for any other object in the same HTML file.

Thereby, when the HTML file is opened with a browser, even though the object of the link destination set with the tag <a name="target"> is not completely displayed in a browser display area, it is possible to display the object of the link destination at an upper end of the browser display area when a user of the PC selects the object of the link source set with the tag <A href="#target"> (for example, see "HTML tag/link tag/set a link to an object on the same page—TAG index," [online], TAG index, [searched on May 11, 2007], Internet URL: http://www.tagindex.com/html_tag/link/a_name-.html).

SUMMARY

However, when a predetermined object is displayed as a link destination in the browser display area in response to an object of the link source being selected as described above, the object of the link destination may not always be displayed at the upper end of the browser display area due to a size of the browser display area and/or a location of the object of the link destination displayed when the language file is opened as a page.

For example, the aforementioned situation can be caused when the browser display area has such a size that even though the end of the page is displayed at a lower end of the browser display area, one or more objects preceding the object of the link destination are displayed in the browser display area. It is noted that a data structure of the HTML file in such a case will be described as a conventional data structure of the HTML file in a following section "Detailed Description" with reference to drawings.

Namely, even though the PC user selects the object of the link source, the object of the link destination is not displayed in the upper end portion of the browser display area, and unfortunately, an object preceding the object of the link destination is displayed at the upper end of the browser display area. Therefore, it is troublesome for the PC user to specify the object of the link destination from a plurality of objects displayed within the browser display area.

Aspects of the present invention are advantageous in that there are provided one or more improved recording media that store thereon a language file described such that when the language file is opened with a browser, in response to a first object set with a second object as a link destination thereof being selected, the second object is displayed in a browser display area so as to enable a user to easily recognize the second object in the browser display area.

According to aspects of the present invention, there is provided a computer readable medium having a browser-openable language file stored thereon, the language file including a first description concerning a first object, a second description concerning a second object, the first and second descriptions being configured to set the first object with the second object specified as a link destination thereof and to display the second object in a display area of a browser in response to the first object being selected on the browser when the language file is opened with the browser, and a third description provided under the second description so as to display a third object with a vertical size substantially equal to or larger than a vertical size of the display area of the browser.

It is noted that an "object" denotes a text, image, or video picture to be displayed in the display area of the browser based upon the language file. Further, the object is not limited to one consisting of a single text or a single image, yet the object may include one consisting of a plurality of texts and/or a plurality of images. Additionally, "a vertical size substantially equal to or larger than a vertical size of the display area of the browser" may be a vertical size identical to the vertical size of the display area of the browser, a vertical size slightly smaller than a vertical size of the display area of the browser, or a vertical size larger than a vertical size of the display area of the browser.

In some aspects of the present invention, the language file includes the third description provided under the second description so as to the third object with a vertical size substantially equal to or larger than the vertical size of the display area of the browser. Therefore, when the language file is opened with the browser, and the first object is selected, even though there are few objects or no object to be displayed under the second object as the link destination of the first object, the third object is displayed with a vertical size substantially equal to or larger than the vertical size of the display area of the browser. Thereby, the second object is certainly displayed in an upper portion of the browser display area. Thus, the user can easily recognize the second object as the link destination of the first object from objects displayed in the browser display area.

According to another aspect of the present invention, there is provided an information processing device that includes an acquiring unit configured to acquire a browser-openable language file, the language file including a first description concerning a first object, and a second description concerning a second object, the first and second descriptions being configured to set the first object with the second object specified as a link destination thereof and to display the second object in a display area of a browser in response to the first object being selected on the browser when the language file is opened with the browser, and an adding unit configured to add, under the second description, a third description to display a third object with a vertical size substantially equal to or larger than a vertical size of the display area of the browser.

With the information processing device configured as above, the same effect as the aforementioned computer readable media can be provided.

According to a further aspect of the present invention, there is provided an information processing device that includes a storage unit configured to store thereon a browser-openable language file, the language file including a first description concerning a first object, a second description concerning a second object, the first and second descriptions being configured to set the first object with the second object specified as a link destination thereof and to display the second object in a display area of a browser in response to the first object being selected on the browser when the language file is opened with the browser, and a third description provided under the second description so as to display a third object with a vertical size substantially equal to or larger than a vertical size of the display area of the browser.

With the information processing device configured as above, the same effect as the aforementioned computer readable media can be provided.

According to a further aspect of the present invention, there is provided a printing device that includes an acquiring unit configured to acquire a browser-openable language file, the language file including a first description concerning a first object, a second description concerning a second object, the first and second descriptions being configured to set the first object with the second object specified as a link destination thereof and to display the second object in a display area of a browser in response to the first object being selected on the browser when the language file is opened with the browser, and a third description provided under the second description so as to display a third object with a vertical size substantially equal to or larger than a vertical size of the display area of the browser, a deleting unit configured to delete the third description from the language file acquired by the acquiring unit, and a printing unit configured to print the language file from which the third description has been deleted by the deleting unit.

With the printing device configured as above, it is possible to delete the third description from the language file acquired. Hence, it is possible to avoid printing the third object and thus wastefully consuming consumable supplies such as ink, toner, and a sheet.

BRIEF DESCRIPTION OF THE ACCOMPANYING DRAWINGS

FIG. 1 schematically shows a configuration of a printing system in an embodiment according to one or more aspects of the present invention.

FIG. 2A shows a conventional data structure of an HTML file.

FIG. 2B shows a data structure of the HTML file in the embodiment according to one or more aspects of the present invention.

FIG. 6A shows a display state when the HTML file described as shown in FIG. 2A with the conventional data structure is opened with the browser.

FIG. 6B shows a display state when the HTML file described as shown in FIG. 2B with the data structure in the embodiment according to one or more aspects of the present invention.

FIG. 7A shows a display state when the HTML file described as shown in FIG. 2A with the conventional data structure is opened with the browser.

FIG. 7B shows a display state when the HTML file described as shown in FIG. 2B with the data structure in the embodiment according to one or more aspects of the present invention.

FIG. 12A shows a data structure of an HTML file specifying an object of a link source in a modification according to one or more aspects of the present invention.

FIG. 12B shows a data structure of an HTML file specifying an object of a link destination in the modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
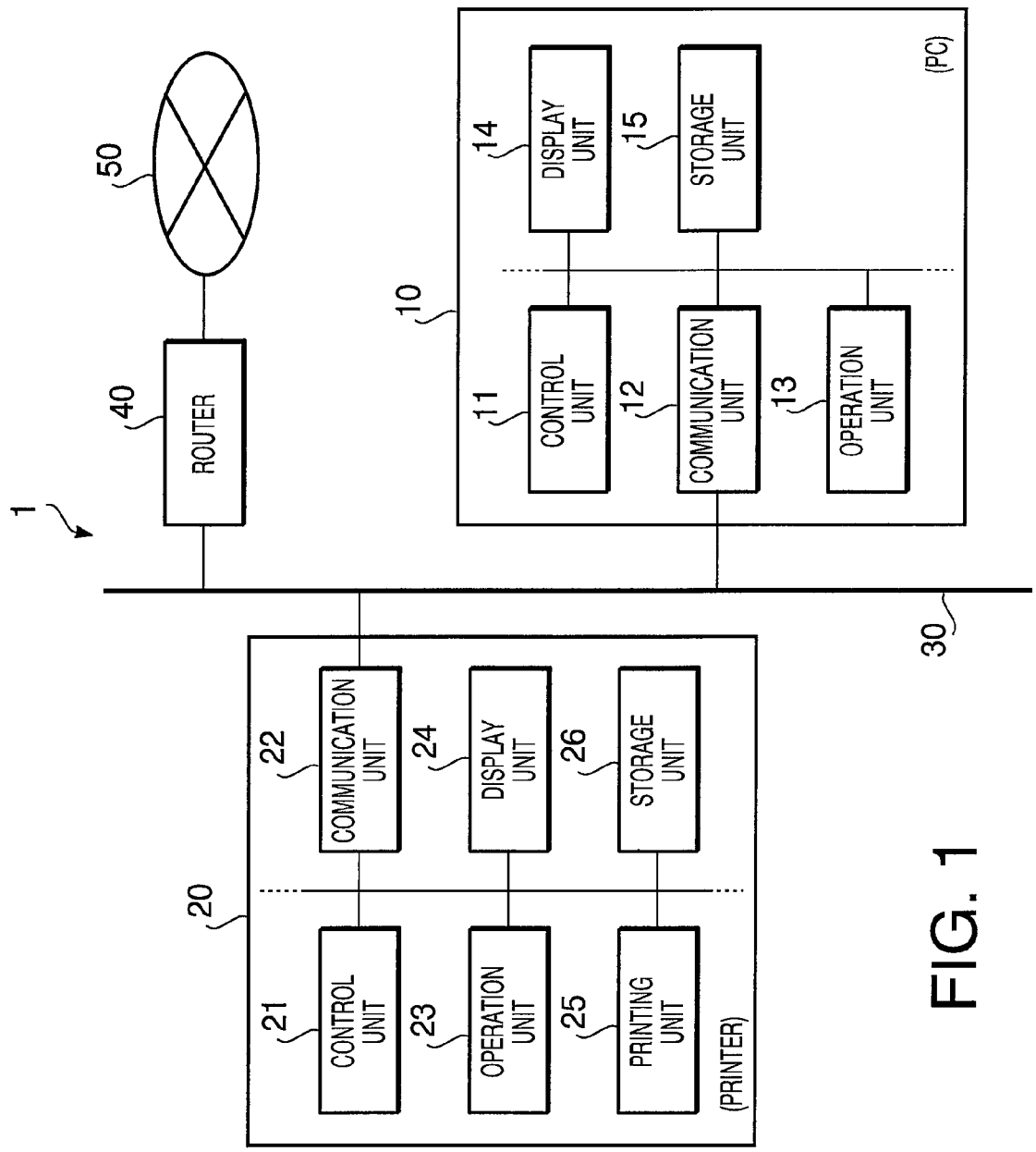

Hereinafter, referring to the accompany drawings, an embodiment according to aspects of the present invention will be described. FIG. 1 is a block diagram schematically showing a configuration of a printing system 1. In the printing system 1, a PC 10 is communicably connected with a printer 20 via a network cable 30. In addition, the PC 10 and the printer 20 are joined with an Internet 50 via a router 40 connected to the network cable 30 so as to be communicable with other network devices (not shown) present on the Internet 50.

The PC 10 is provided with a CPU, ROM, and RAM (which are not shown), and further provided with a control unit 11 connected to the network cable 30 to control each operation of the PC 10 (namely, control the entire PC 10), an operation unit 13 configured to accept an instruction from a user of the PC 10, a display unit 14 configured to display thereon various information, and a storage unit 15 configured with a hard disk drive.

It is noted that the storage unit 15 stores thereon HTML files described in HTML such as manual data of the printer 20 and web page data. Further, the storage unit 15 stores thereon a browser application program (hereinafter referred to as a browser) which is read out by the control unit 11 and configured to display an object such as a text, image, and video picture as a page on the display unit 14 based upon descriptions in an HTML file. In the following description, an HTML file opened with the browser may be referred to as a "page."

Additionally, as described below, the HTML file is described such that an object as a link destination associated with link destination object information corresponding to link information specifying the link destination is displayed in a browser display area when an object such as a character and image associated with the link information is selected by a user's operation through the operation unit 13 while the aforementioned HTML file is opened with the browser (while the aforementioned HTML file is displayed on the display unit 14). It is noted that the browser display area is an area in which objects are actually displayed based upon descriptions in the HTML file.

The browser is provided with a scroll bar such that a page, which cannot completely be shown within the browser display area at once, can be scrolled therewith. Namely, the user can cause an object described in an unshown area on the page to be displayed in the browser display area by operating the scroll bar. Additionally, the browser is configured such that the size thereof can be changed by a user's operation through the operation unit 13.

The printer 20 includes a CPU, ROM, RAM (which are not shown), and further includes a control unit 21 configured to control each operation of the printer 20 (control the entire printer 20), a communication unit 22 connected with the network cable 30 to control communication with other devices, an operation unit 23 configured to accept therethrough an instruction from the user of the printer 20, a printing unit 25 as an image forming unit, and a storage unit 26 configured with a hard disk drive.

Additionally, the printer 20 can develop the HTML file as a page based upon various programs stored in the storage unit 26 as well as the browser provided to the PC 10, and further display the page on the display unit 24 and print out the page with the printing unit 25.

Hereinafter, referring to FIGS. 2 to 7, a data structure of the HTML file in the present embodiment will concretely be explained in comparison with a conventional data structure of the HTML file.

Figures 2A, 2B:
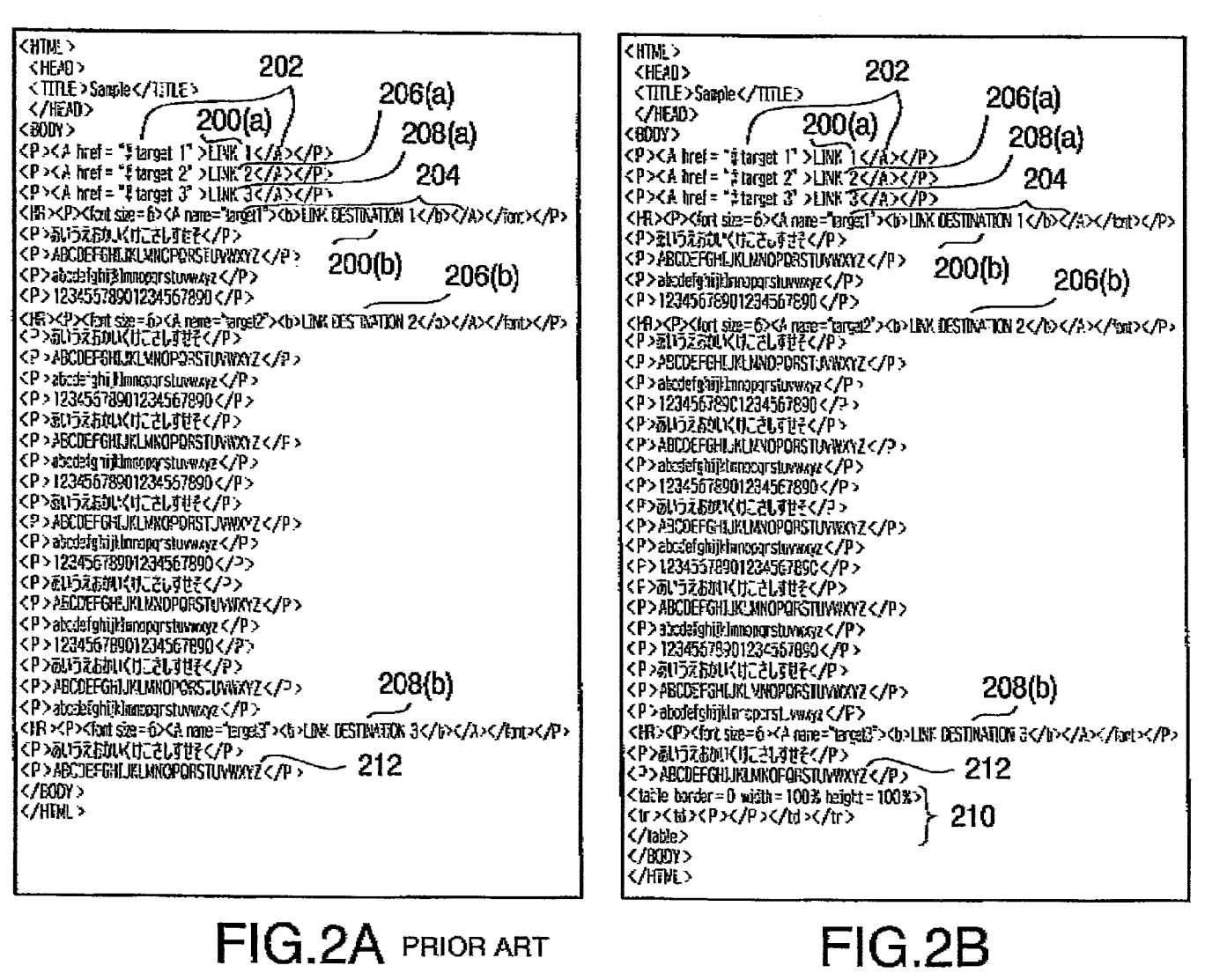

FIG. 2A is an example of a conventional data structure of an HTML file in a state shown on the display unit 14 with an application such as a text editor. In addition, FIG. 2B is an example of a data structure of an HTML file in the present embodiment, in a state shown on the display unit 14 with the text editor. It is noted that the HTML file is configured with descriptions representing various tags which cannot be shown when the HTML file is opened with the browser and objects which can be shown when the HTML file is opened with the browser. Since the various tags of the HTML file are commonly known, detailed explanation thereof will be omitted.

In any of the HTML files shown in FIGS. 2A and 2B, "link 1" 200(*a*) as an object displayable in the browser display area is associated with link information 202 represented by tags <A href="#target1"> and </A>. In addition, "link destination 1" 200(*b*), as an object of a link destination corresponding to the link information 202, is associated with link destination object information 204 represented by tags <A name="target1"> and </A>.

Thereby, when any of the HTML files is displayed as a page with the browser, in response to the "link 1" 200(*a*) being selected, the "link destination 1" 200(*b*) set as a link destination can be displayed in the browser display area.

In the same manner, "link 2" 206(*a*) and "link 3" 208(*a*) are associated with respective link information, and by selecting the "link 2" 206(*a*) or "link 3" 208(*a*), "link destination 2" 206(*b*) or "link destination 3" 208(*b*) associated with respective link destination object information can be displayed in the browser display area.

Further, the HTML file with the conventional data structure shown in FIG. 2A is configured as a page of such a size that all objects described in the HTML file cannot be displayed at once in the browser display area when being opened with the browser, and that a scroll operation is required for displaying unshown objects. Furthermore, the HTML file shown in FIG. 2A is configured such that even though the page is scrolled to the end thereof, the object of the link destination associated with the corresponding link destination object information is displayed in such a position as not to reach an upper end of the browser display area. A more particular explanation will be given with reference to FIG. 3.

Figure 3:
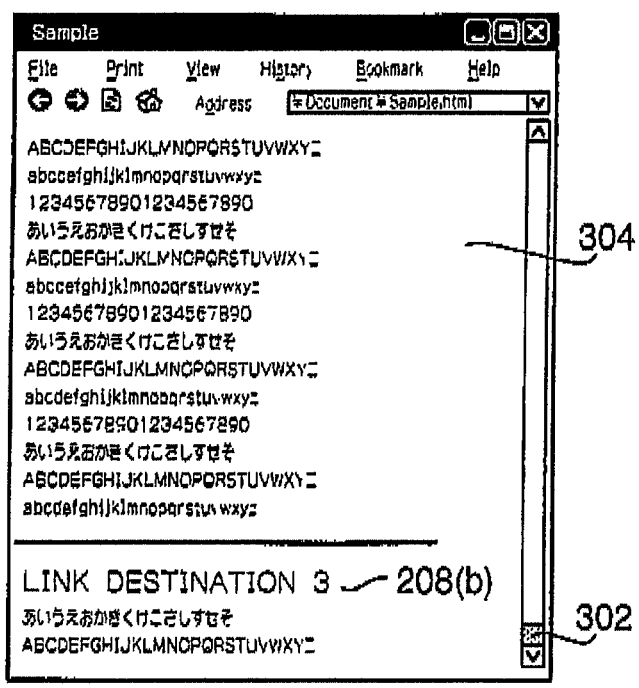
FIG. 3 shows a display state when the HTML file shown in FIG. 2A is opened with a browser and scrolled to an end of a page with a scroll bar.

FIG. 3 shows a display state when the HTML file shown in FIG. 2A is opened with the browser and scrolled to the end of the page with the scroll bar 302. The "link destination 3" 208(*b*), as the object of the link destination corresponding to the object of the link source "link 3" 208(*a*), is described so as to be displayed in the vicinity of the end of the page. Therefore, even though the page is scrolled to the end thereof as shown in FIG. 3, the "link destination 3" 208(*b*) cannot be displayed at an upper end portion of the browser display area 304. Namely, some objects preceding the object of the link destination "link destination 3" 208 are displayed in the browser display area. It is noted that reference characters of the scroll bar 302 and browser display area 304 will be omitted in the drawings following FIG. 3.

Meanwhile, the HTML file provided with the data structure shown in FIG. 2B specific to the present embodiment is different from the HTML file shown in FIG. 2A in that the HTML file shown in FIG. 2B includes a description of a table tag 210 in addition to the aforementioned configuration of the HTML file with the conventional data structure shown in FIG. 2A. Hence, the data structure of the HTML file in the present embodiment includes a description for displaying a table in an area that follows a final object 212 described in the last among objects displayable in the browser display area in the conventional HTML file. Therefore, when the HTML file with the data structure shown in FIG. 2B is opened with the browser, the table is displayed at the end of the page.

Further, the table tag 210 is configured with a description "border=0." In other words, the table tag 210 is described such that the table is displayed with a thickness of a frame line (boarder line) thereof "0."

In addition, the table tag 210 is also configured with a description "width=100% height=100%." The value "100%" is a percentage of the size of the table to the browser display area. Therefore, even though the size of the browser display area is changed, the size of the table can be changed in accordance with the described percentage. Further, the table can always be displayed with the same size as the browser display area.

However, in this respect, actual dimensions of the browser display area displayed on the display unit 14 cannot definitely be the same as those of the table whose percentages to the browser display area are specified to be 100% on the display unit 14. Although the size of the table is defined in the HTML file to be identical to the browser display area, the browser display area is sometimes slightly larger on the display unit 14 depending on the sort or settings of the browser. Yet, in the present embodiment, even in such a case, it is represented that the size of the table is identical to that of the browser display area.

Further, since the table is not defined with a specific color, an apparent color of the table visually recognized by the user is the same as a background color of the HTML file displayed on the browser.

Subsequently, an operation based upon the difference between the data structures shown in FIGS. 2A and 2B will be described with reference to FIGS. 4A, 4B, 5A, 5B, 6A, 6B, 7A, and 7B. FIGS. 4A, 5A, 6A, and 7A show display states when the conventional HTML file described as shown in FIG. 2A is opened with the browser. Meanwhile, FIGS. 4B, 5B, 6B, and 7B show display states when the HTML file described as shown in FIG. 2B with the data structure specific to the present embodiment is opened with the browser.

Figure 4A:
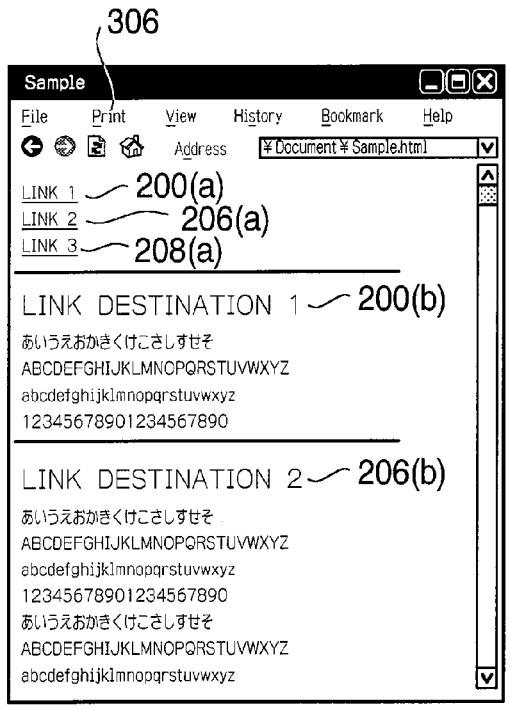
FIG. 4A shows a display state when the HTML file described as shown in FIG. 2A with the conventional data structure is opened with the browser.
Figure 4B:
FIG. 4B shows a display state when the HTML file described as shown in FIG. 2B with the data structure in the embodiment according to one or more aspects of the present invention.

As shown in FIGS. 4A and 4B, in a state where each of the HTML files is merely opened with the browser, the "link 1" 200(a) is displayed at the top of displayable objects, namely, at the upper end of the browser display area.

Figure 5A:
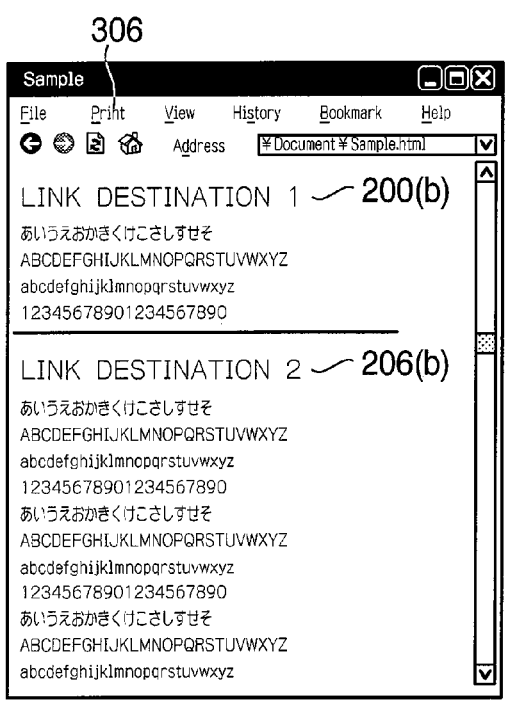
FIG. 5A shows a display state when the HTML file described as shown in FIG. 2A with the conventional data structure is opened with the browser.
Figure 5B:
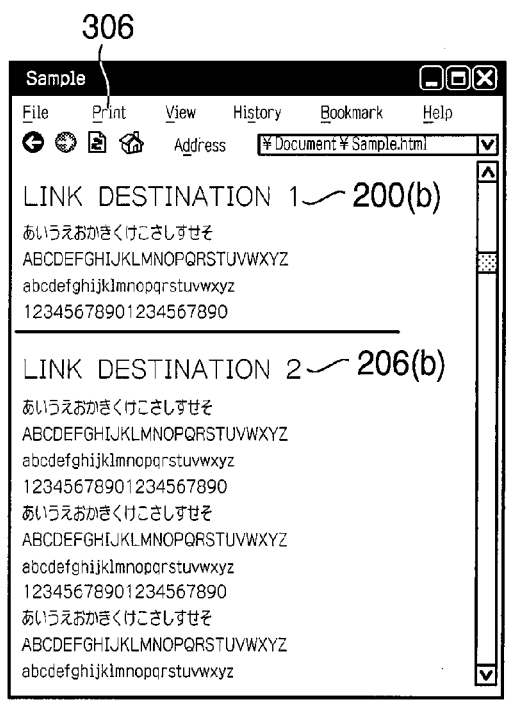
FIG. 5B shows a display state when the HTML file described as shown in FIG. 2B with the data structure in the embodiment according to one or more aspects of the present invention.

Then, in each of the HTML files, for example, when the "link 1" 200(a) is selected, as shown in FIGS. 5A and 5B, the "link destination 1" 200(b), which is an object specified as a link destination of the "link 1" 200(a), is displayed at the upper end of the browser display area. Thereby, the user of the PC 10 can easily find out a desired object of the link destination from a plurality of objects present on the page.

Further, as well as when the "link 1" 200(a) is selected, when the "link 2" 206(a) is selected, as shown in FIGS. 6A and 6B, the "link destination 2" 206(b), which is an object specified as a link destination of the "link 2" 206(a), is displayed at the upper end of the browser display area.

The reason why an object of a link destination is thus displayed at the upper end of the browser display area is as follows. A lot of objects following the object of the link destination "link destination 1" 200(b) or "link destination 2" 206(b) are displayed in the browser display area. Namely, even though the object of the link destination "link destination 1" 200(b) or "link destination 2" 206(b) is displayed at the upper end of the browser display area, a lot of objects, which cannot completely be displayed at once within a vertical size of the browser display area, follow the object of the link destination "link destination 1" 200(b) or "link destination 2" 206(b). In such a case, by selecting an object of a link source, the object of the link destination can be displayed at the upper end of the browser display area.

Next, when the "link 3" 208(a) is selected in each of the HTML files, as shown in FIGS. 7A and 7B, the "link destination 3" 208(b), which is an object specified as a link destination of the "link 3" 208(a), is displayed in the browser display area.

In such a case, in the conventional data structure of the HTML shown in FIG. 2A, there is no description regarding other objects following the final object 212 to be displayed on the browser. Therefore, since there is no object such as a text and image to be displayed that follows the final object 212, as shown in FIG. 7A, the "link destination 3" 208(b) as the object of the link destination cannot be displayed at the upper end of the browser display area. Namely, since the page, which includes objects to be displayed in the conventional HTML file shown in FIG. 2A, is completely displayed to the end thereof, the "link destination 3" 208(b) cannot be displayed in a further upper area of the browser display area.

Therefore, even though the user of the PC 10 selects the object of the link source "link 3" 208(a), the object of the link destination "link destination 3" 208(b) is not displayed in an upper area of the browser display area. Hence, the user has to examine where, in the browser display area, a desired object of the link destination is described. When a lot of objects are displayed in the browser display area, the above user's operation becomes more troublesome.

However, when the HTML file is provided with the data structure of the present embodiment as shown in FIG. 2B, as described above, a table is displayed with a size always identical to the size of the browser display area, under the final object 212 displayed on the browser by the aforementioned table tag 210. Namely, as shown in FIG. 7B, an object to be displayed with a size identical to the size of the browser display area is present under the final object 212. Therefore, there is an object (table) to be displayed with a size identical to the browser display area, under the object of the link destination to be displayed at the upper end of the browser display area. Thus, unlike the conventional data structure of the HTML file shown in FIG. 2A, even though the "link 3" 208(a) is selected, it is possible to display the "link destination 3" 208(b) at the upper end of the browser display area.

In this manner, when the user of the PC 10 selects the "link 3" 208(a), the object of the link destination can always be displayed at the upper end of the browser display area. Therefore, the user of the PC 10 can easily find the object of the link destination and be freed from such a troublesome operation as to search an desired object from a plurality of objects displayed in the browser display area. It is noted that, as described above, the table is displayed on the browser so as not to be visually recognized by the user. Hence, the user of the PC 10 can browse the page without knowing that the table is inserted thereinto.

Further, when the HTML with the data structure specific to the present embodiment (see FIG. 2B) is opened with the browser, the table is displayed as a final object placed at the end of all objects displayable in the browser display area. Hence, even though the HTML file is described such that other objects are displayed under the object of the link destination, when the HTML file is displayed on the browser, the object of the link destination and the above other objects can be displayed without having to change display formats thereof. Accordingly, the user of the PC 10 can easily find the object of the link destination from objects displayed on the browser display area without the easiness of browsing the HTML file in the browser display area being spoiled by the insertion of the table.

The problem to be solved by the present invention is caused by such a data structure of the HTML file that there are few objects or no object under the object of the link destination. As a manner to solve the above problem other than the aforementioned technique, there can be considered a technique to insert two or more line feeds, spaces, or meaningless character strings after the object of the link destination. However, in this case, a required number of the line feeds, spaces, or meaningless character strings varies depending on the size of the browser display area or character size. Thus, the number of the line feeds, spaces, or meaningless character strings may not satisfy the number required for displaying the object of the link destination at the upper end of the browser display area. In such a case, there is no essential difference between the data structure according to the above technique and the conventional data structure of the HTML file.

In this respect, the aforementioned data structure in the present embodiment is configured such that the size of the table varies so as to be identical to the size of the browser display area even though the size of the browser display area is changed. Thereby, it is possible to display an intended object of a link destination at the upper end of the browser display area even though the size of the browser display area is changed.

Hereinafter, the explanation of the HTML file provided with the data structure shown in FIG. 2B in the present embodiment will be continued. The HTML file includes a description to display the table with a size identical to the size of the browser display area. Therefore, when a printing operation is performed for the HTML file, the table is also printed as well as the other objects displayed on the browser.

Hence, when there are few objects to be printed, the objects can be printed on a single sheet along with the table having the size identical to the browser display area. Yet, when there are many objects, a page including only the table may be printed. In such a case, when print settings are configured such that printing is carried out with a printing date and/or storage location information of the HTML file as a printed subject being attached, since the table configured with the descriptions that the frame line is "0" and the background color is not specified is not actually printed, the printing date and/or storage location information are only printed on a sheet on which the table is only printed as objects to be printed. Hence, consumable supplies such as ink, toner, and a sheet are wastefully consumed.

Figure 8:
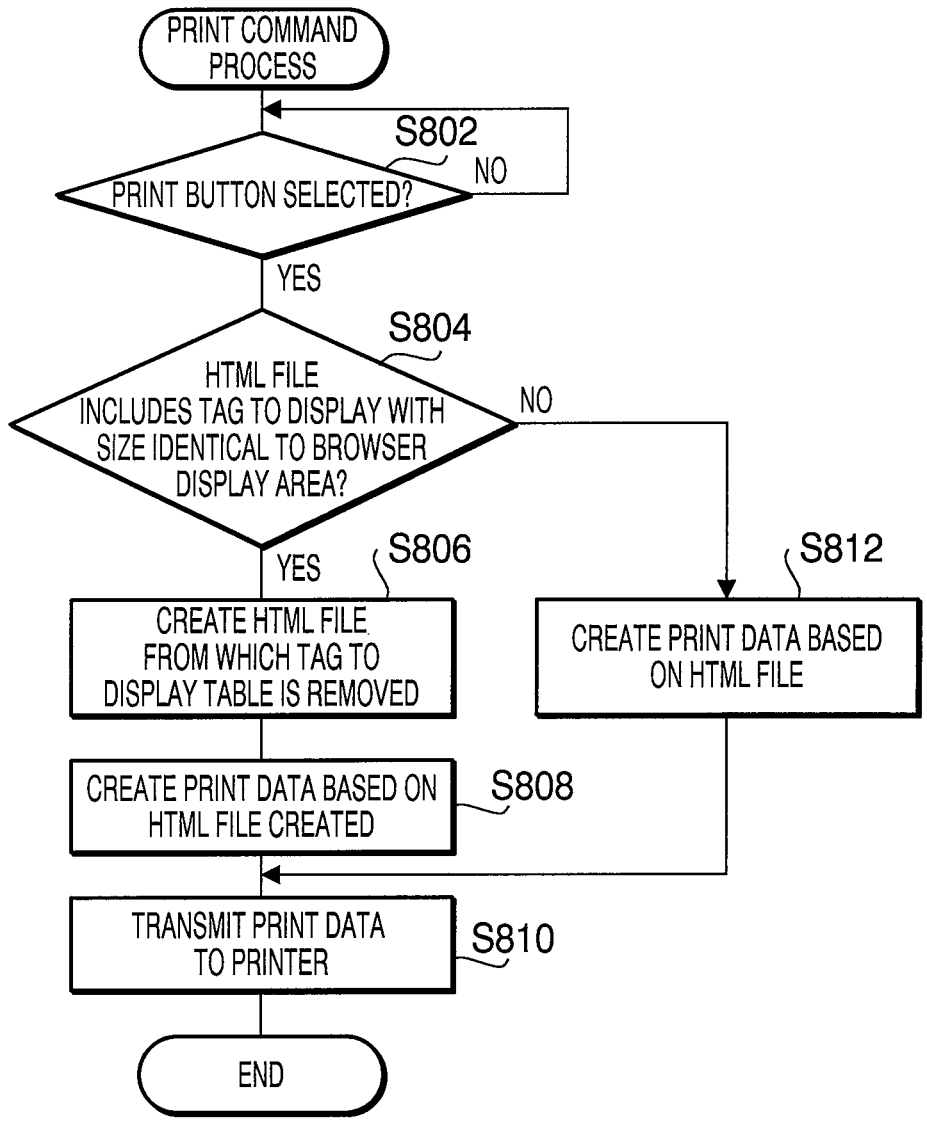
FIG. 8 is a flowchart showing a print command process in the embodiment according to one or more aspects of the present invention.

To solve the above problem, when a print command is issued by the PC 10 to the printer 20, a following process is executed. A process to be executed when the HTML file opened with the browser is printed with the printer 20 will be explained with reference to FIG. 8. FIG. 8 is a flowchart showing a print command process to be executed by the control unit 11 of the PC 10.

Firstly, when the HTML file to be printed is opened with the browser, it is determined whether a print button 306 (for example, see FIG. 4B) of the browser is selected by the user of the PC 10 through the operation unit 13 (S802). When it is determined that the print button 306 is not selected (S802: No), the control unit 11 waits ready for the selection of the print button 306.

When it is determined that the print button 306 is selected (S802: Yes), it is determined whether a tag described to display a table with a size identical to the browser display area is included in the HTML file being opened with the browser (S804). Specifically, the above tag represents the table tag 210 shown in FIG. 2B.

When it is determined that a tag described to display a table with a size identical to the browser display area is included in the HTML file being opened with the browser (S804: Yes), an HTML file from which the tag is removed is created (S806). Namely, by deleting a description relating to the table tag 210 "<table . . . > to </table> from the HTML file shown in FIG. 2B, the HTML file shown in FIG. 2A is created as a result.

Then, based upon the created HTML file, print data described in a page description language readable by the printer 20 is created (S808). Thereafter, the created print data is transmitted to the printer 20 (S810).

Meanwhile, when it is determined that a tag described to display a table with a size identical to the browser display area is not included in the HTML file being opened with the browser (S804: No), namely, when the HTML file is not a file including the table tag 210 as shown in FIG. 2A, based upon the HTML file, print data described in the page description language readable by the printer 20 is created (S812). Then, the present process advances to S810, in which the print data is transmitted to the printer 20.

With the aforementioned print command process, it is possible to delete the table that provides an advantage when the HTML file is displayed on the browser yet no advantage when it is printed and then issue the print command. Thereby, it is possible to prevent wasteful usage of the consumable supplies such as ink, toner, and a printing sheet. Further, since the print data corresponding to the table is not transmitted, it is possible to avoid increased data traffic to be caused by transmitting the print data corresponding to the table.

Further, in addition to printing the print data transmitted by the PC 10 as described above, the printer 20 may directly acquire data of a web page or the like from a network device on the Internet 50 in accordance with an instruction from the PC 10 or a user's operation through the operation unit 23 of the printer 20 and print the acquired data.

Figure 9:
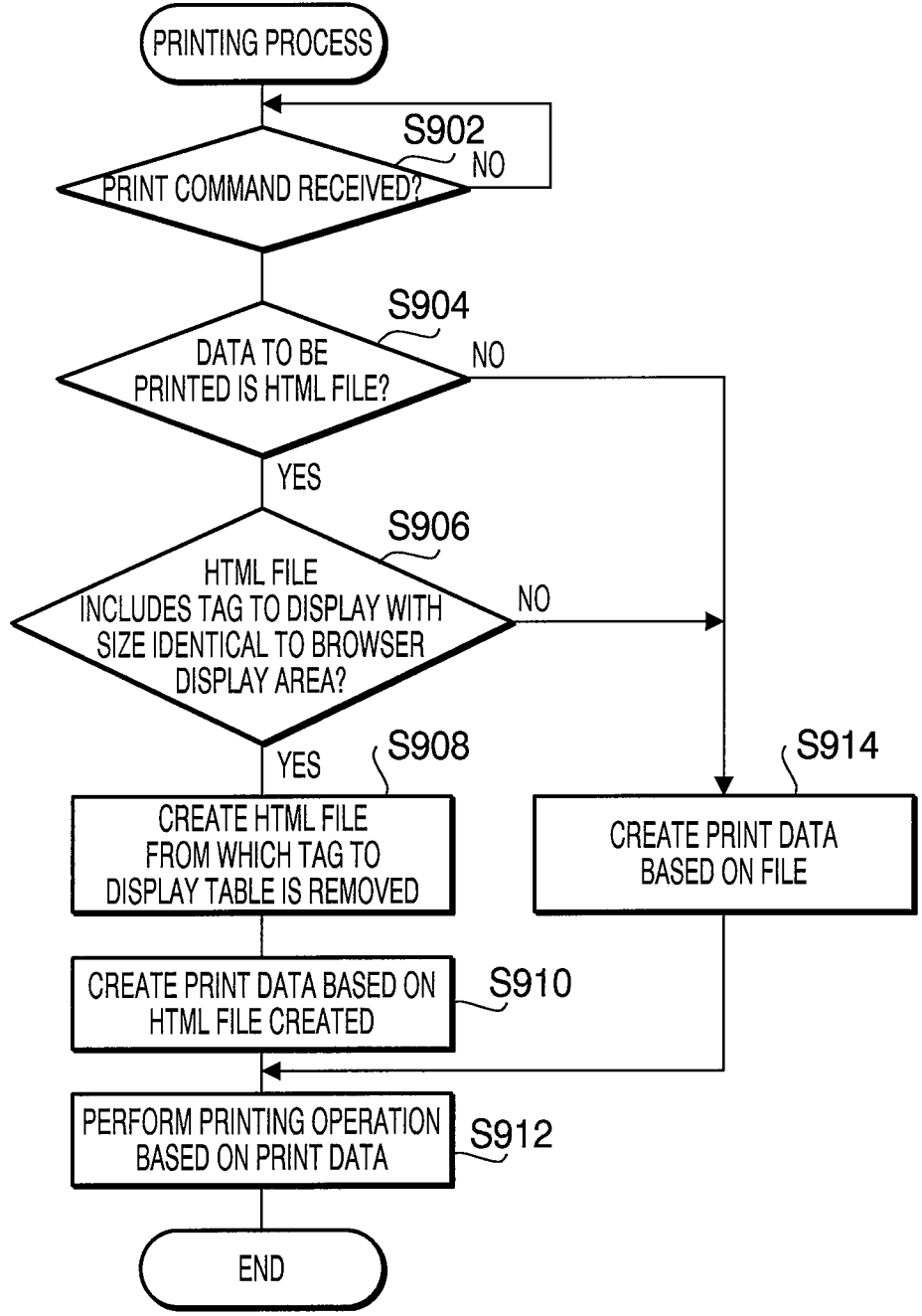
FIG. 9 is a flowchart showing a printing process in the embodiment according to one or more aspects of the present invention.

In such a case, the printer 20 performs a following printing process. FIG. 9 is a flowchart showing a printing process to be executed by the printer 20. It is noted that the printing process is controlled by the control unit 21 based upon a program stored in the storage unit 26 of the printer 20.

Firstly, it is determined whether a print command is received from the operation unit 23 or the PC 10 for the data acquired in accordance with the instruction from the PC 10 or the operation through the operation unit 23 (S902). When it is determined that a print command is not received (S902: No), the control unit 21 waits ready for the print command.

When it is determined that a print command is received (S902: Yes), it is determined whether the data to be printed based upon the print command is an HTML file (S904). When it is determined that the subject data is an HTML file (S904: Yes), the present process advances to S906. It is noted that the determination of whether the subject data is an HTML file is made based upon an extension of the acquired data or a file sort identifier described in a header of the data.

In S906, it is determined whether the HTML file to be printed includes a tag described to display a table with a size identical to the browser display area (S906). When it is determined that the HTML file to be printed includes a tag described to display a table with a size identical to the browser display area (S906: Yes), an HTML file from which the tag is removed is created (S908).

Then, based upon the created HTML file, print data described in the page description language readable by the printer 20 is created (S910). Thereafter, a printing operation is performed based upon the created print data (S912).

On the other hand, when it is determined in S904 that the subject data is not an HTML file (S904: No), or when it is determined that the HTML file to be printed does not include a tag described to display a table with a size identical to the browser display area (S906: No), based upon the HTML file to be printed in response to the print command, print data described in the page description language readable by the printer 20 is created (S914). Then, a printing operation is performed based upon the created print data (S912).

With the aforementioned printing process, it is possible to delete the table that provides an advantage when the HTML file is displayed on the browser yet no advantage when it is printed and then issue the print command. Thereby, it is possible to prevent wasteful usage of the consumable supplies such as ink, toner, and a printing sheet.

In addition, the PC 10 may acquire an HTML file such as a web page from a network device on the Internet 50, and display the acquired HTML file on the display unit 14 with the browser. In such a case, the acquired HTML file may not always include the table tag 210 described as shown in FIG. 2B.

Figure 10:
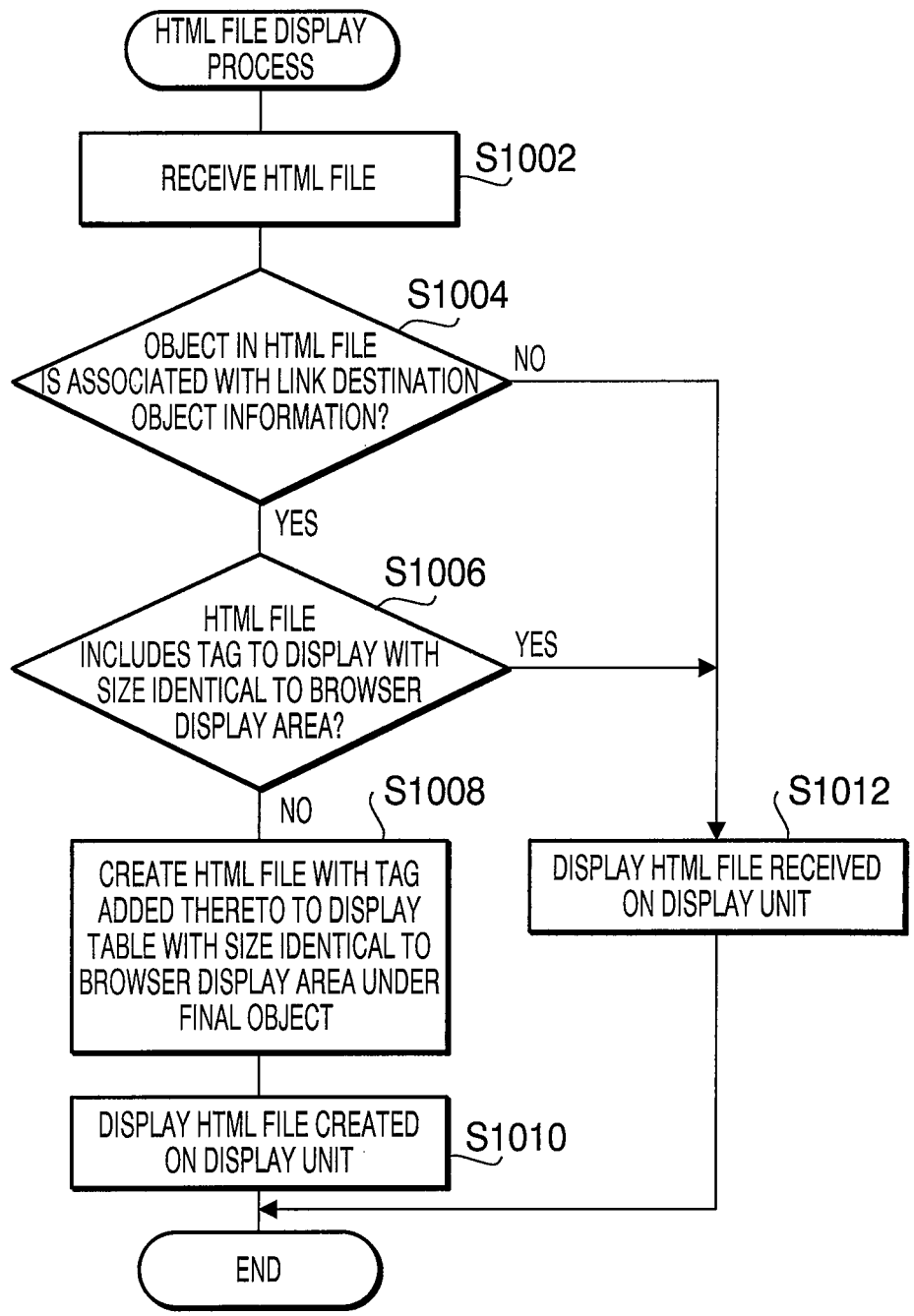
FIG. 10 is a flowchart showing an HTML file display process in the embodiment according to one or more aspects of the present invention.

For this reason, the PC 10 is configured such that when the PC 10 receives an HTML file externally transmitted which does not contain a description for displaying a table with a size identical to the browser display area, the description is additionally written into the HTML file. FIG. 10 is a flowchart showing an HTML file display process to be executed by the PC 10. It is noted that the HTML file display process is controlled by the control unit 11 based upon a program stored on the storage unit 15 of the PC 10.

Firstly, the PC 10 receives an HTML file from the printer 20 or a network device on the Internet 50 (S1002). Then, it is determined whether the link destination object information is associated with any object in the HTML file received (S1004).

When it is determined that the link destination object information is associated with any object in the HTML file received (S1004: Yes), it is determined whether the HTML file includes a tag for displaying a table with a size identical to the browser display area (S1006).

When it is determined that the HTML file does not include a tag for displaying a table with a size identical to the browser display area (S1006: No), an HTML file is created with the tag added thereto to display the table with a size identical to the browser display area under the final object 212 of objects displayable in the browser display area in the HTML file (S1008). It is noted that the tag to be added is previously stored on the storage unit 15. Subsequently, the created HTML file is displayed on the display unit 14 with the browser (S1010).

Meanwhile, when it is determined that the link destination object information is not associated with any object in the HTML file received (S1004: No), or when it is determined in S1006 that the HTML file received includes a tag for displaying a table with a size identical to the browser display area (S1006: Yes), the HTML file received is displayed on the display unit 14 with the browser (S1012).

By executing the aforementioned HTML file display process, even though the link destination object information is associated with an object in the HTML file, and the HTML file does not contain a description for displaying the table with a size identical to the browser display area at the end of the objects displayed on the browser, it is possible to always display the object of the link destination at the upper end of the browser display area when the HTML file is opened with the browser, and the object of the link source is selected.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

The above embodiment has provided the data structure of the HTML file that includes the table tag 210 for displaying the table with a size identical to the vertical and horizontal dimensions of the browser display area. However, when the HTML file is described such that the text is displayed in a manner horizontally written and vertically scrolled when the HTML file is opened with the browser, at least a vertical size of the table has only to be specified.

Additionally, an object described as an ending object of the HTML file is not limited to a table as described in the above embodiment, and may be an image or a horizontal rule mark described with a tag <HR>. In this case, in the same manner as the table tag 210 shown in FIG. 2B, the size of the image or the horizontal rule mark may be specified with a percentage to the size of the browser display area.

Further, the object such as the table, image, and horizontal rule mark displayed with a size identical to the size of the browser display area may be set without a color thereof being specified, in the same manner as the above embodiment. Thereby, the object is displayed with the same color as a background color displayed while the HTML file is opened with the browser. It causes such a favorable result that the user can browse the page without knowing the object inserted thereto. In addition, even though the color of the object is specified, when the specified color is the same color as the background color displayed while the HTML file is opened with the browser, the same effect can be provided. Furthermore, when the background is displayed with a pattern and/or color tone while the HTML file is opened with the browser, the same effect can be provided by specifying the pattern and/or color tone of the object with the same ones as the background.

The above embodiment has given the description on such a conventional data structure of the HTML file that all objects cannot be displayed at once in the browser display area when the HTML is opened with the browser. However, when there are a small number of objects to be displayed, or a wide browser display area is provided, all objects may be displayed at once in the browser display area.

In such a case, in the same manner as the aforementioned embodiment, when the HTML file is described with the conventional data structure such that the object of the link destination is displayed in the object display area in response to the object of the link source being selected, the object of the link destination cannot be displayed at the upper end of the browser display area. This is because, as described above, the object of the link destination cannot be scrolled upward in the browser display area since all objects are displayed at once in the browser display area owing to few objects or no object under the object of the link destination.

However, according to the present invention, the HTML file has such a data structure that an object (table in the above embodiment) with a size identical to the browser display area is displayed as an ending object. Therefore, the object of the link destination can be displayed at the upper end of the browser display area owing to the presence of the object (table). Thus, the user can easily find out the object of the link destination.

Further, although the description <table border=0 width=100% height=100%> is included in the HTML file in the above embodiment, the table does not have to a size of 100% to the size of the browser display area. A percentage of the size of the table to the size of the browser display area may be set accordingly such that the object of the link destination is displayed in such an upper portion of the browser display area that the user can easily recognize the object of the link destination in the browser display area.

Figure 11A:
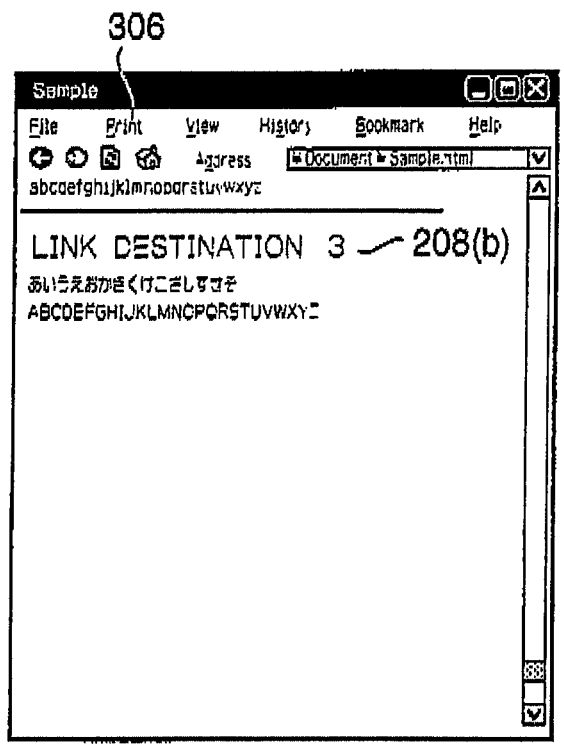
FIG. 11A shows a display state on the browser when a vertical size of a table is set with "height=90%" in the embodiment according to one or more aspects of the present invention.
Figure 11B:
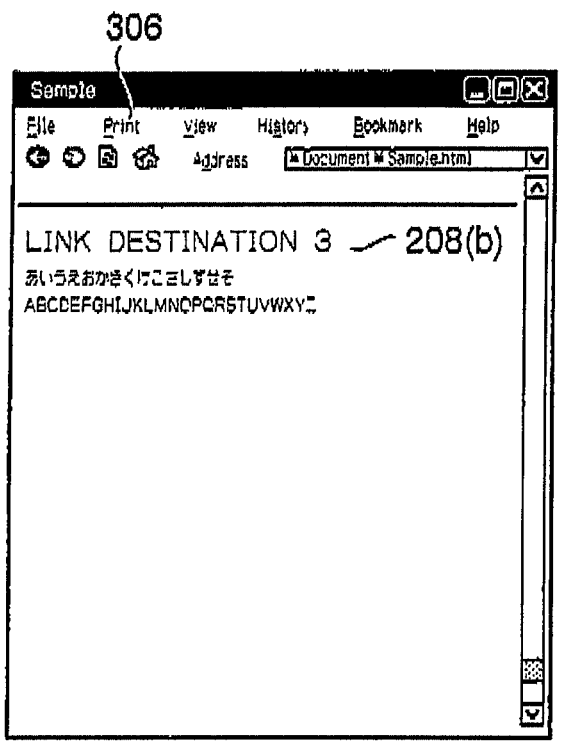
FIG. 11B shows a display state on the browser when the vertical size of the table is set with "height=95%" in the embodiment according to one or more aspects of the present invention.

For example, FIG. 11A shows a display state on the browser when the vertical size of the table is set with "height=90%," and FIG. 11B shows a display state on the browser when the vertical size of the table is set with "height=95%." In any of the both cases, one or more objects (character string and/or horizontal rule mark) preceding the "link destination 3" 208(*b*) as the object of the link destination are displayed in the browser display area, and the object of the link destination is not displayed at the upper end of the browser display area. However, when objects displayed preceding the object of the link destination are as few as this, the user of the PC 10 can easily recognize the object of the link destination "link destination 3" 208(*b*).

In this manner, the size of the table may be set accordingly such that the object of the link destination is displayed in such an upper portion of the browser display area that the user can easily recognize the object of the link destination. The setting may be configured through a user's operation with the operation unit 13. Additionally, the size of the table may be set accordingly depending on a vertical space between the objects displayed in the browser display area or a character size. Then, the set size of the table may be stored onto the storage unit 15 of the PC 10, and utilized as a value representing the size of the table of the tag added in S1008 of the aforementioned HTML file display process (see FIG. 10). Thereby, it is possible to display an intended object of the link destination in a user-desired display state.

Additionally, as described above, the table may be set with a size of 100% to the size of the browser display area, or with such a size that the user of the PC 10 can easily find out the object of the link destination.

Further, the link information is not limited to information specifying an object associated with the link destination object information in the identical HTML file as the object of the link destination. An object, which specifies a different HTML file as the link destination and is associated with a tag <a name=" . . . "> that is the link destination object information in the different HTML file as the link destination, may be specified as the object of the link destination. For example, FIG. 12A shows an HTML file (file name: "sample1.html") specifying the object of the link source, and FIG. 12B shows an HTML file (file name: "sample2.html") specifying the object of the link destination.

In FIG. 12A, an object "link" 1100 that is an object to be displayed in the browser display area is associated with link information 1102 represented by tags <href="sample2.html="sample2.html#target"> and </A>. The link information 1102 specifies an object specified as "target" in the file "sample2.html" as the object of the link destination. Further, in FIG. 12B, an object "link destination" as an object of a link destination corresponding to the link information 1102 is associated with link destination information 1106 represented by tags <A name="target"> and </A>.

Thereby, when the object of the link source "link" 1100 is selected while the HTML file shown in FIG. 12A is opened with the browser, the object of the link destination "link destination" 1104 in the HTML file of the link destination (sample2.html) can be displayed in the browser display area.

In this case, a tag 1110 is described to display the table with a size identical to the browser display area under a final object 1108 of the HTML file (sample2.html) of the link destination, in the same manner as the above embodiment. Hence, even though there are few objects or no object to be displayed under the object of the link destination, the intended object of the link destination can certainly be displayed at the upper end of the browser display area. Thus, the user of the PC 10 can easily find out the object of the link destination.

An object (table in the above embodiment) to be inserted as an ending object of the HTML file may be specified with a percentage of the size thereof to the size of the browser display area as described above. Additionally, the object may be specified with concrete numerical values such as horizontal and vertical numbers of pixels determined based upon a resolution of the display unit 14. For example, when the screen resolution of the display unit 14 is defined as 1024 (horizontal)×768 (vertical), it is possible to display an object with a size larger than at least the size of the browser display area by specifying the size of the object with a tag <table border=0 width="1024" height="768">, and the same effect as the aforementioned embodiment can be provided. It is noted that the screen resolution may be obtained from a driver configured to control the display unit 14 that is stored on the storage unit 15 of the PC 10, and the obtained value may be utilized as the size of the table for the tag to be added in S1008 of the aforementioned HTML file display process (see FIG. 10).

The aforementioned embodiment has been described with an example of the HTML file as a subject to be opened with the browser. However, the subject to be opened with the browser is not limited to the HTML file, and may be a language file capable of being displayed with a display application such as the browser, for example, which includes a file described in an Extensible HyperText Markup Language (XHTML). Namely, the subject to be opened with the browser may be a file described to insert an object with a size substantially equal to or larger than the browser display area as the table of the aforementioned embodiment.

What is claimed is:

1. A non-transitory computer-readable medium having a browser-openable language file stored thereon, the language file comprising:
   a first description concerning a first object;
   a second description concerning a second object, the second object being set as a link destination of the first object such that the second object is displayed in a display area of a browser in response to the first object being selected on the browser when the language file is opened with the browser; and
   a third description concerning a third object, the third description provided under the second description, the third description being configured such that the third object is set with:
      a vertical size substantially equal to or larger than a vertical size of the display area of the browser, and
      a visual display attribute configured to cause the third object to be displayed in the display area under the second object, such that both the second object and the third object are displayed in the display area of the browser in response to the first object being selected, wherein a thickness of a border line of the third object is equal to zero and a color of the third object is identical to a background color of the display area of the browser,
   wherein a fourth object displayed between the second object and the third object is displayed in an area smaller than the display area of the browser, and
   wherein the second object is positioned at an upper end of the display area of the browser, by the third object being displayed under the second object displayed in response to the first object being selected, in accordance with the vertical size of the third object, the thickness of the border line of the third object, and the color of the third object.

2. The non-transitory computer-readable medium according to claim 1,
wherein the third description includes a description to vary the vertical size of the third object depending on a change in the vertical size of the display area of the browser.

3. The non-transitory computer-readable medium according to claim 1,
wherein the vertical size to which the third object is set is identical to the vertical size of the display area of the browser.

4. The non-transitory computer-readable medium according to claim 1,
wherein the visual display attribute of the third description is configured to cause the third object to be displayed at an end of all objects displayed in the display area of the browser when the language file is opened with the browser.

5. The non-transitory computer-readable medium of claim 1,
wherein the second description is under the first description in the browser-openable language file.

6. The non-transitory computer-readable medium of claim 1,
wherein the second object is under the first object in a page defined by the browser.

7. The non-transitory computer-readable medium of claim 1, wherein the third object being set with the vertical size substantially equal to or larger than the vertical size of the display area of the browser comprises setting to 100% a percentage of the vertical size of the third object with respect to the vertical size of the display area of the browser.

8. The non-transitory computer-readable medium of claim 1, wherein the third object is displayed in a position lower than any other object displayed by the browser-openable language file.

9. The non-transitory computer-readable medium of claim 1, wherein the third object is not displayed between the first object and the second object.

10. An information processing device, comprising:
a processor; and
memory storing computer-readable instructions that, when executed, cause the information processing device to:
acquire a browser-openable language file that comprises:
a first description concerning a first object; and
a second description concerning a second object, the second object being set as a link destination of the first object such that the second object is displayed in a display area of a browser in response to the first object being selected on the browser when the language file is opened with the browser; and
add, under the second description, a third description concerning a third object, the third description configured such that a third object is set with:
a vertical size substantially equal to or larger than a vertical size of the display area of the browser, and
a visual display attribute configured to cause the third object to be displayed under the second object, such that both the second object and the third object are displayed in the display area of the browser in response to the first object being selected, wherein a thickness of a border line of the third object is equal to zero and a color of the third object is identical to a background color of the display area of the browser,
wherein a fourth object displayed between the second object and the third object is displayed in an area smaller than the display area of the browser,
wherein the second object is positioned at an upper end of the display area of the browser, by the third object being displayed under the second object displayed in response to the first object being selected, in accordance with the vertical size of the third object, the thickness of the border line of the third object, and the color of the third object.

11. The information processing device according to claim 10, wherein the computer-readable instructions, when executed, cause the information processing device to:
determine whether the acquired language file includes the third description,
wherein the third description is added under the second description in response to determining that the acquired language file does not include the third description.

12. An information processing device, comprising:
a storage unit configured to store thereon a browser-openable language file that comprises:
a first description concerning a first object;
a second description concerning a second object, the second object being set as a link destination of the first object such that the second object is displayed in a display area of a browser in response to the first object being selected on the browser when the language file is opened with the browser; and
a third description concerning a third object, the third description provided under the second description, the third description being configured such that the third object is set with:
a vertical size substantially equal to or larger than a vertical size of the display area of the browser, and
a visual display attribute configured to cause the third object to be displayed in the display area under the second object, such that both the second object and the third object are displayed in the display area of the browser in response to the first object being selected, wherein a thickness of a border line of the third object is equal to zero and a color of the third object is identical to a background color of the display area of the browser,
wherein a fourth object displayed between the second object and the third object is displayed in an area smaller than the display area of the browser, and
wherein the second object is positioned at an upper end of the display area of the browser, by the third object being displayed under the second object displayed in response to the first object being selected, in accordance with the vertical size of the third object, the thickness of the border line of the third object, and the color of the third object.

13. The information processing device according to claim 12, comprising memory storing computer-readable instructions that, when executed, cause the information processing device to:
delete the third description from the language file stored on the storage unit; and
issue a print command to print the language file from which the third description has been deleted.

14. The information processing device according to claim 13, wherein the computer-readable instructions, when executed, cause the information processing device to determine whether the language file stored on the storage unit includes the third description,
   wherein the print command to print the language file from which the third description has been deleted is issued in response to determining that the language file stored on the storage unit includes the third description, and
   wherein a print command to print the language file stored on the storage unit is issued in response to determining that the language file stored on the storage unit does not include the third description.

15. A printing device, comprising:
a processor; and
memory storing computer-readable instructions that, when executed, cause the printing device to:
   acquire a browser-openable language file that comprises:
      a first description concerning a first object;
      a second description concerning a second object, the second object being set as a link destination of the first object such that the second object is displayed in a display area of a browser in response to the first object being selected on the browser when the language file is opened with the browser; and
      a third description concerning a third object, the third description provided under the second description, the third description being configured such that the third object is set with:
         a vertical size substantially equal to or larger than a vertical size of the display area of the browser, and
         a visual display attribute configured to cause the third object to be displayed in the display area under the second object, such that both the second object and the third object are displayed in the display area of the browser in response to the first object being selected, wherein a thickness of a border line of the third object is equal to zero and a color of the third object is identical to a background color of the display area of the browser,
   wherein a fourth object displayed between the second object and the third object is displayed in an area smaller than the display area of the browser,
   wherein the second object is positioned at an upper end of the display area of the browser, by the third object being displayed under the second object displayed in response to the first object being selected, in accordance with the vertical size of the third object, the thickness of the border line of the third object, and the color of the third object;
   delete the third description from the language file; and
   print the language file from which the third description has been deleted.

16. The printing device according to claim 15, wherein the computer-readable instructions, when executed, cause the printing device to determine whether the language file includes the third description,
   wherein the printing device is configured to delete the third description from the language file and print the language file from which the third description has been deleted in response to determining that the language file includes the third description, and
   wherein the printing device is configured to print the acquired language file in response to determining that the acquired language file does not include the third description.

17. A non-transitory computer-readable medium storing a browser-openable language file comprising:
   a first plurality of descriptions concerning a plurality of first objects;
   a second plurality of descriptions concerning a plurality of second objects, each second object of the plurality of second objects set as a link destination of a corresponding first object of the plurality of first objects when the language file is opened with a browser, and each second object configured to be displayed in a display area of the browser in response to the corresponding first object being selected on the browser; and
   a description concerning a third object configured to have a vertical size substantially equal to a vertical size of the display area of the browser, and to be displayed under a bottom-most second object of the plurality of second objects, such that both the bottom-most second object and the third object are displayed in the display area of the browser in response to the corresponding first object being selected on the browser, wherein a thickness of a border line of the third object is equal to zero and a color of the third object is identical to a background color of the display area of the browser,
   wherein the second object is positioned at an upper end of the display area of the browser, by the third object being displayed under the bottom-most second object displayed in response to the first object being selected, in accordance with the vertical size of the third object, the thickness of the border line of the third object, and the color of the third object,
   wherein a fourth description concerning a fourth object does not exist between two second descriptions of the second plurality of descriptions.

18. The non-transitory computer-readable medium of claim 17, wherein the plurality of first objects comprises a plurality of link sources, the plurality of second objects comprises a plurality of link destinations, and the third object comprises a table.

* * * * *